US008179906B1

(12) United States Patent
Rogers et al.

(10) Patent No.: US 8,179,906 B1
(45) Date of Patent: May 15, 2012

(54) COMMUNICATION NETWORK ELEMENTS WITH APPLICATION STACKING

(75) Inventors: Frederick C. Rogers, Olathe, KS (US); Lyle T. Bertz, Lee's Summit, MO (US); Salvador Cerda, Jr., Peculiar, MO (US); Jeremy R. Breau, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 373 days.

(21) Appl. No.: 11/857,488

(22) Filed: Sep. 19, 2007

(51) Int. Cl.
*H04L 12/28* (2006.01)

(52) U.S. Cl. .................................. 370/401; 455/414.1

(58) Field of Classification Search .............. 370/401, 370/254; 455/414.1
See application file for complete search history.

(56) References Cited

U.S. PATENT DOCUMENTS

| | | | |
|---|---|---|---|
| 5,721,828 A | 2/1998 | Frisch | |
| 6,430,286 B1 | 8/2002 | Bhusri | |
| 7,161,945 B1* | 1/2007 | Cummings | 370/401 |
| 2002/0059425 A1 | 5/2002 | Belfiore et al. | |
| 2003/0126233 A1 | 7/2003 | Bryers et al. | |
| 2004/0215770 A1* | 10/2004 | Maher et al. | 709/224 |
| 2006/0136570 A1 | 6/2006 | Pandya | |
| 2006/0143350 A1 | 6/2006 | Miloushev et al. | |
| 2006/0230124 A1 | 10/2006 | Belfiore et al. | |
| 2006/0262791 A1* | 11/2006 | Kadambi et al. | 370/389 |
| 2007/0073898 A1* | 3/2007 | Shen | 709/245 |
| 2007/0258469 A1 | 11/2007 | Bennett | |
| 2008/0039055 A1* | 2/2008 | Hannikainen et al. | 455/414.1 |
| 2008/0198975 A1* | 8/2008 | Whitehead et al. | 379/67.1 |

OTHER PUBLICATIONS

Matthias A. Blumrich, et al.; "Virtual Memory Mapped Network Interface for the SHRIMP Multicomputer;" In Proceedings of the 21st Annual International Symposium on Computer Architecture; Apr. 1994; pp. 142-153; Panasonic Technologies, Incorporated; Princeton, New Jersey.
U.S. Appl. No. 11/857,480, filed Sep. 19, 2007.
Ethernity Networks Ltd; "Ethernity Networks to Launch its 20Gbps NPU and Traffic Manager Solution at NXTcomm07;" Jun. 18, 2007; 2 pages; Israel.

\* cited by examiner

*Primary Examiner* — Robert Wilson
*Assistant Examiner* — Wei Zhao

(57) ABSTRACT

A communication network element comprises an I/O interface, memory, processing circuitry, and bus structure. The I/O interface receives and transfers a user packet. The memory stores the user packet, management software, and communication applications. The processing circuitry executes the management software to provide a manager and executes the communication applications to provide service functions. The service functions retrieve the user packet from the memory based on memory pointers, process the user packet, and store the processed user packet in the memory. The manager transfers the memory pointers between the service functions. The bus structure couples the I/O interface, the memory, and the processing circuitry.

20 Claims, 9 Drawing Sheets

| PACKET FLOW | FUNCTION (F) SEQUENCE | |
|---|---|---|
| | PACKETS 1-M | PACKETS M-N |
| A | F1 – F2 – F3 | F1 – F3 – F4 |
| B | F2 – F3 | F1 – F4 |
| C | F1 – F4 | F1 – F4 |
| ••• | ••• | ••• |

# COMMUNICATION NETWORK ELEMENTS WITH APPLICATION STACKING

BACKGROUND

1. Field of the Invention

The invention is related to the field of communications, and in particular, to communication network element architectures that stack software applications.

2. Description of the Prior Art

A communication network transfers communications to provide various services to its customers. A few examples of these services include telephony, Internet access, and media delivery that are provided to mobile user devices. The communication network is comprised of communication links and network elements. The communication links transfer the communications between the users and the network elements, and between the network elements themselves. The network elements process the communications to perform various functions that comprise the communication services. These functions include authorizing users to obtain the services and routing user traffic to provide the services, although there are many other communication service functions.

A network element is often a computer platform with hardware and software. The hardware typically includes Input/Output (I/O) interfaces, processing circuitry, and memory devices that are coupled by bus structures. The software typically includes an operating system and an application. The software application provides a function for the communication service. For example, the application may provide the function of authenticating the user and authorizing the authenticated user to obtain the communication service.

The I/O interfaces in the computer system exchange the communications with the communication links. The memory devices store the communications. The processing circuitry executes the software to process the communications. The processing circuitry executes the software application to provide a specific communication service function and executes the operating system to provide an interface between the software application and the hardware.

Unfortunately, the computer platform restricts the ability to stack numerous software applications in the same network element. The restriction is based on the fixed amount of processing, memory, and I/O in the computer platform. More specifically, the ratio of processing to memory to I/O is fixed. Typically, each communication service function requires a unique ratio of processing, memory, and I/O. This requirement has led to single-function network elements with computer platforms that are customized with the unique ratio of processing, memory, and I/O.

A communication service typically requires several functions, so multiple single-function network elements are required to provide all of the functions for the communication service. These network elements exchange communications for the communication service over communication links. Unfortunately, the transfer of the communications over the communication links requires extra time, software, and hardware. To receive communications into a network element from a communication link, the operating system, driver, and I/O hardware must inter-operate to execute a communication stack (OSI layers 1-3). A reciprocal process occurs to transfer communications from the network element over a communication link.

A communication service with several functions requires several network elements to provide these functions. Each network element must execute a communication stack to receive the communications and execute a communication stack to transfer the communications. Thus, significant delay is added to the communication service to allow the network elements to exchange communications over communication links. For real-time communication services (voice, audio, video), the added delay may cause a critical degradation of service.

The use of single-function network elements requires a large number of network elements to provide a robust set of communication services. The large number of network elements results in network topology that is too complex. The complex network topology is difficult and expensive to operate. The complex network topology also has many points-of-failure.

A new computer platform is becoming available that provides more flexibility in the ratio of processing, memory, and I/O. The new computer platform comprises a blade server with user-selectable blades. The blades include processing blades, memory blades, and I/O blades. The processing blades can be Central Processing Unit (CPU) blades, Graphics Processing Unit (GPU) blades, or Field Programmable Gate Array (FPGA) blades. The blades are coupled by interface circuitry and bus structures to provide inter-process communications that avoid the use of conventional communication stacks.

The user may select the type of blades and the number of each type for the blade server. The user may also select some of the circuitry (chips) that provide the processing, memory, and I/O on the blades. Thus, the user may control the ratio of processing to memory to I/O. One example of such a computer platform is the ALTIX 4000 supplied by Silicon Graphics Incorporated. Unfortunately, this computer platform has not been effectively used to stack software applications in a network element.

SUMMARY

In some embodiments, a communication network element comprises an I/O interface, memory, processing circuitry, and bus structure. The I/O interface receives and transfers a user packet. The memory stores the user packet, management software, and communication applications. The processing circuitry executes the management software to provide a manager and executes the communication applications to provide service functions. The service functions retrieve the user packet from the memory based on memory pointers, process the user packet, and store the processed user packet in the memory. The manager transfers the memory pointers between the service functions. The bus structure couples the I/O interface, the memory, and the processing circuitry.

BRIEF DESCRIPTION OF THE DRAWINGS

The same reference number represents the same element on all drawings.

FIG. 5 illustrates network element operation in an example of the invention.

DETAILED DESCRIPTION OF THE PREFERRED EMBODIMENT

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
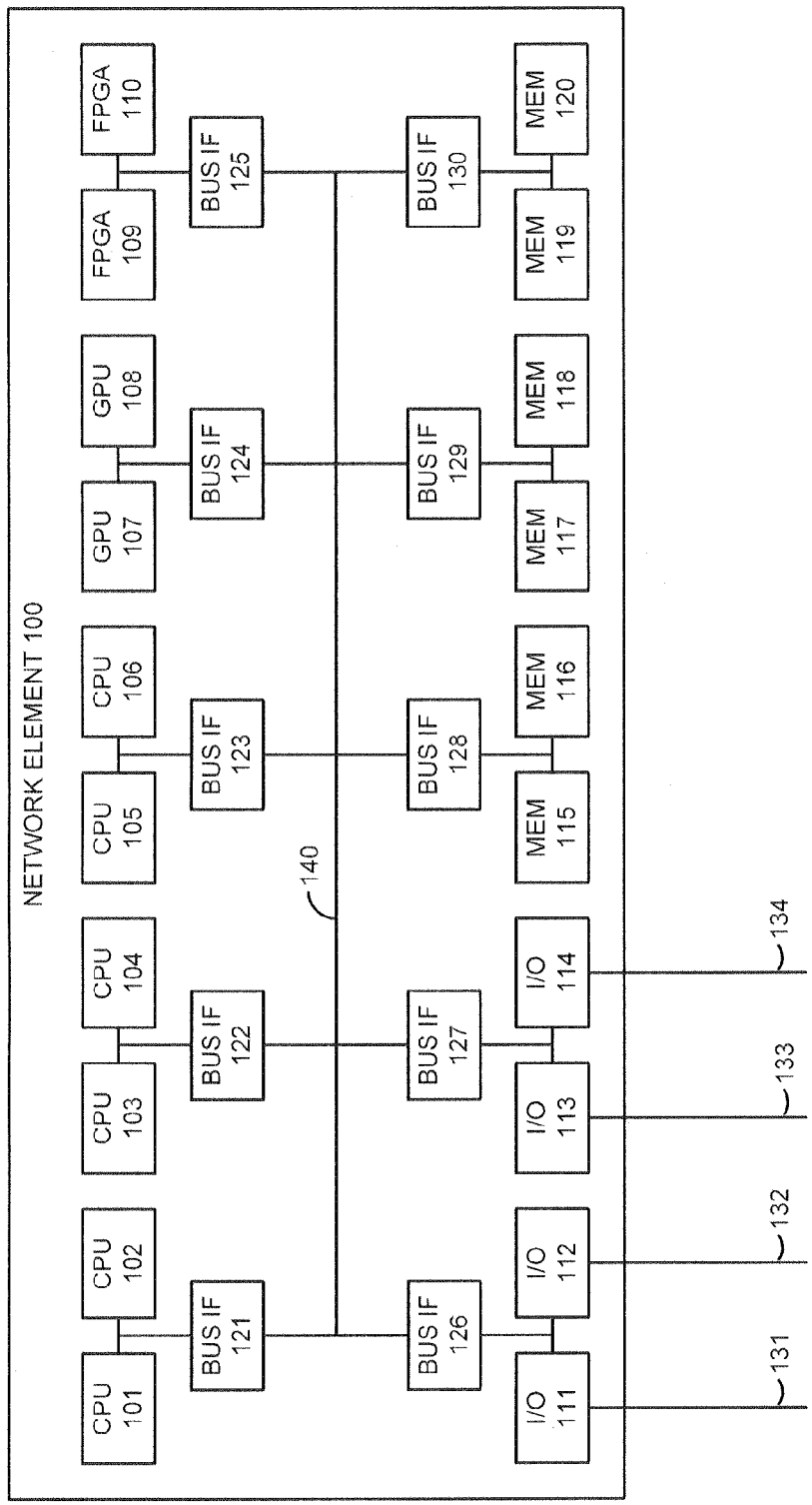
FIG. 1 illustrates a network element in an example of the invention.

FIG. 1 illustrates network element 100 in an example of the invention. Network element 100 includes processing circuitry that is comprised of CPUs 101-106, GPUs 107-108, and FPGAs 109-110. Network element 100 includes I/O devices 111-114 that are coupled to respective communication links 131-134. Network element 100 includes memory devices 115-120 that store operating system and application software. Memory devices 115-120 also store communications that are exchanged over communication links 131-134.

Network element 100 includes bus interfaces 121-129 that are coupled to bus structure 140. Bus interface 121 is coupled to CPUs 101-102. Bus interface 122 is coupled to CPUs 103-104. Bus interface 123 is coupled to CPUs 105-106. Bus interface 124 is coupled to GPUs 107-108. Bus interface 125 is coupled to FPGAs 109-110. Bus interface 126 is coupled to I/O devices 111-112. Bus interface 127 is coupled to I/O devices 113-114. Bus interface 128 is coupled to memory devices 115-116. Bus interface 129 is coupled to memory devices 117-118. Bus interface 130 is coupled to memory devices 119-120.

Network element 100 represents a specific embodiment of the invention, but this embodiment could be varied to form other embodiments of the invention. In other embodiments, the number of CPUs, GPUs, FPGAs, I/O devices, memory devices, and bus interfaces may be different, and some of these elements could be omitted altogether. In some embodiments, memory devices, processing circuitry, and I/O devices could share bus interfaces. Network element 100 could be adapted from the ALTIX 4000 supplied by Silicon Graphics Incorporated.

Network element 100 provides multiple communication service functions for a communication service. To provide the multiple communication service functions within the same network element, CPUs 101-106, GPUs 107-108, and FPGAs 109-110 processes multiple stacked software applications. Advantageously, communications between the stacked applications are transferred over bus interfaces 121-130 and bus structure 140. Thus, multiple communication service functions may communicate over a bus instead of communication links to avoid the delay of processing two communication stacks between the functions. In addition, fewer network elements are required to provide a communication service, so the complexity of the network topology is reduced.

Figure 2:
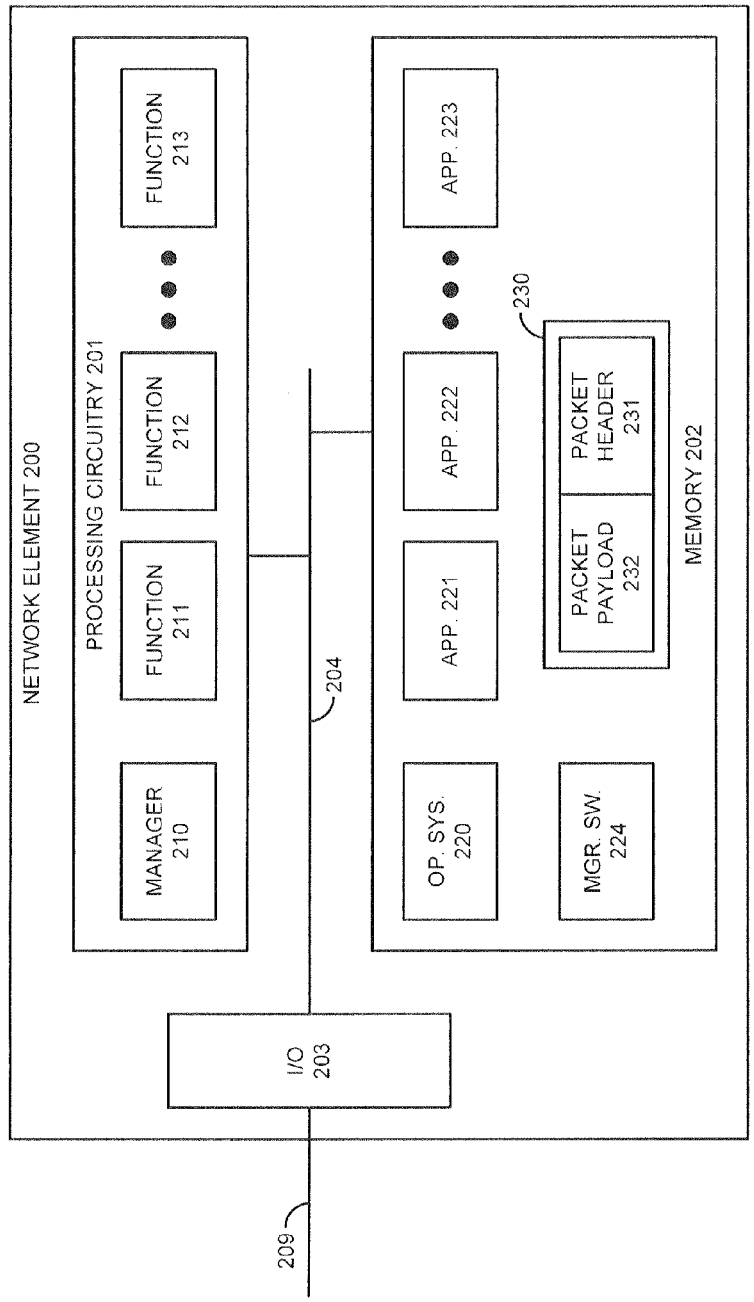
FIG. 2 illustrates a network element in an example of the invention.

FIG. 2 illustrates network element 200 in an example of the invention. Network element 200 includes processing circuitry 201, memory 202, and I/O 203 that are coupled together over bus 204. I/O 203 is coupled to communication link 209. Memory 202 stores operating system 220, software applications 221-223, and manager software 224. Processing circuitry 201 retrieves and executes operating system 220, applications 221-223, and manager software 224. Manager software 224 directs processing system to provide manager 210. Applications 221-223 direct processing system 201 to provide respective communication service functions 211-213. Thus, network element 200 stacks multiple software applications 221-223 to provide multiple communication service functions 211-213. Advantageously, communications between communication service functions 211-213 occur over bus 204 instead of communication links to avoid the delay of processing two communication stacks between the functions.

Network element 200 could be configured from network element 100 as follows. Processing circuitry 201 could be comprised of CPUs 101-106, GPUs 107-108, and FPGAs 109-110. I/O 223 could be comprised of I/O devices 111-114. Memory 202 could be comprised of memory devices 115-120. Bus 204 could be comprised of bus interfaces 121-130 and bus structure 140. As stated above, network element 100 could be varied to form other embodiments, and these variations could also be used for network element 200.

Figure 3:
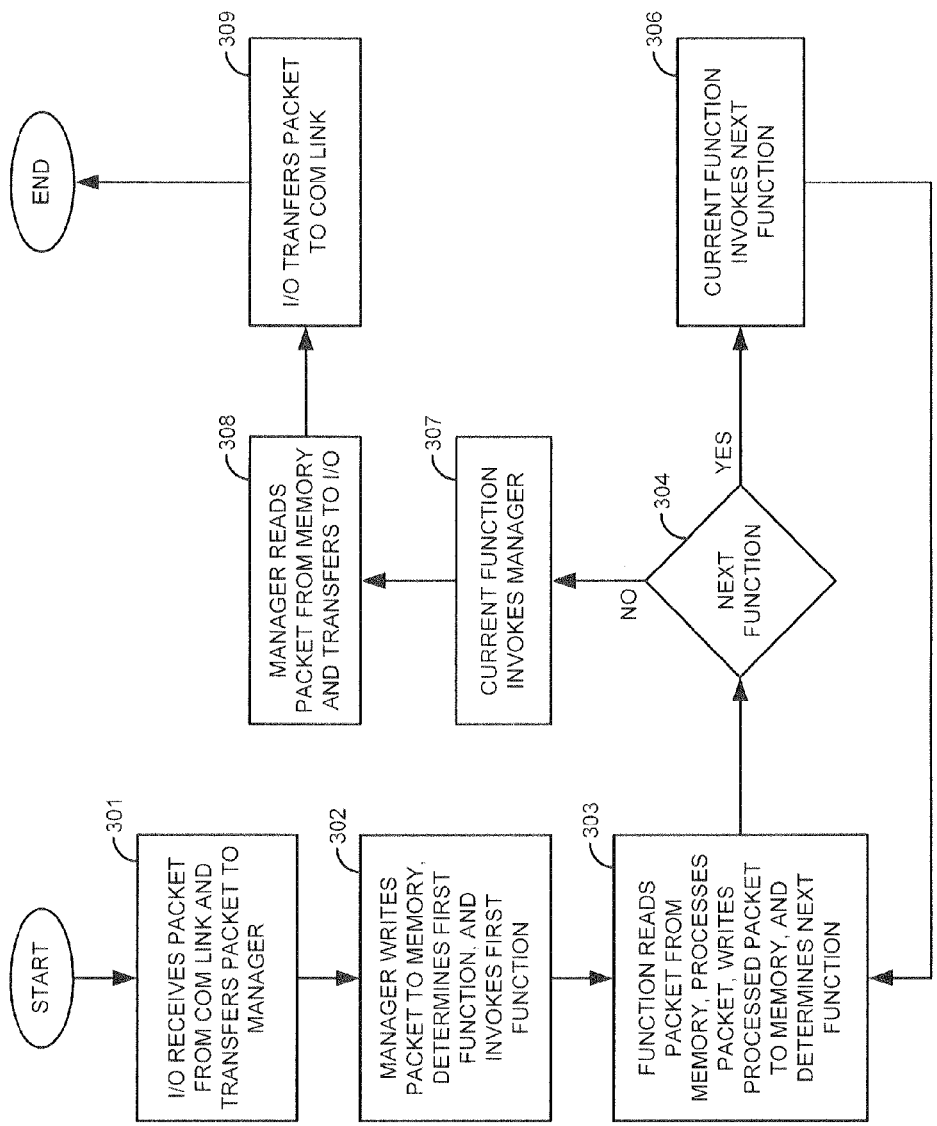
FIG. 3 illustrates network element operation in an example of the invention.

FIG. 3 illustrates the operation of network element 200 in an example of the invention. The reference numbers from FIG. 3 are indicated parenthetically below. I/O 203 receives communication packet 230 from communication link 209 and transfers packet 230 to manager 210 (301). Manager 210 writes packet 230 to memory 202 and determines the first function to process packet 230 (302). In this example, the first function is function 211, so manager 210 invokes function 211 to process packet 230 (302). Typically, this includes transferring a pointer from manager 210 to function 211 where the pointer points to the current location of packet 230 in memory 202.

Function 211 reads packet 230 from memory 202 and processes packet 230 to provide its communication service function (303). Function 211 writes the processed packet 230 to memory 202 and determines the next function (if any) to process packet 230 (303). If there is a next function (304), function 211 invokes the next function (306). In this example, the second function is function 212, so function 211 invokes function 212 to process packet 230 (306). Typically, this includes transferring a pointer from function 211 to function 212 where the pointer points to the current location of packet 230 in memory 202.

Function 212 reads packet 230 from memory 202 and processes packet 230 to provide its communication service function (303). Function 212 writes the processed packet 230 to memory 202 and determines the next function (if any) to process packet 230 (303). If there is a next function (304), function 212 invokes the next function (306). In this example, the third function is function 213, so function 212 invokes function 213 to process packet 230 (306). Typically, this includes transferring a pointer from function 212 to function 213 where the pointer points to the current location of packet 230 in memory 202.

Function 213 reads packet 230 from memory 202 and processes packet 230 to provide its communication service function (303). Function 213 writes the processed packet 230 to memory 202 and determines the next function (if any) to process packet 230 (303). In this example, there is no fourth function (304), so function 213 invokes manager 210 to process packet 230 in memory 202 (307). Typically, this includes transferring a pointer from function 213 to manager 210 where the pointer points to the current location of packet 230 in memory 202.

Manager 210 reads packet 230 from memory 202 and transfers packet 230 to I/O 203 (308). Alternatively, the last function 213 could have transferred packet 230 to I/O 203 to relieve manager 210 of this task. I/O 203 transfers packet 230 to communication link 209 (309).

Note that multiple communication service functions pass memory pointers from one function to the next, so multiple functions may process a packet within the same network element. These pointers pass between processing circuitry over bus structures or over on-board chip-to-chip interfaces. The pointers do not pass over communication links that require communication stack processing.

Also note that the communication service functions read and write packets to memory, so multiple functions may process the packet within the same network element. The packets are transferred between the communication service functions through memory without transferring the packets through a communication protocol stack. These packets pass between processing circuitry over bus structures or over on-board chip-to-chip interfaces. The packets do not pass over communication links that require communication stack processing.

Figure 4:
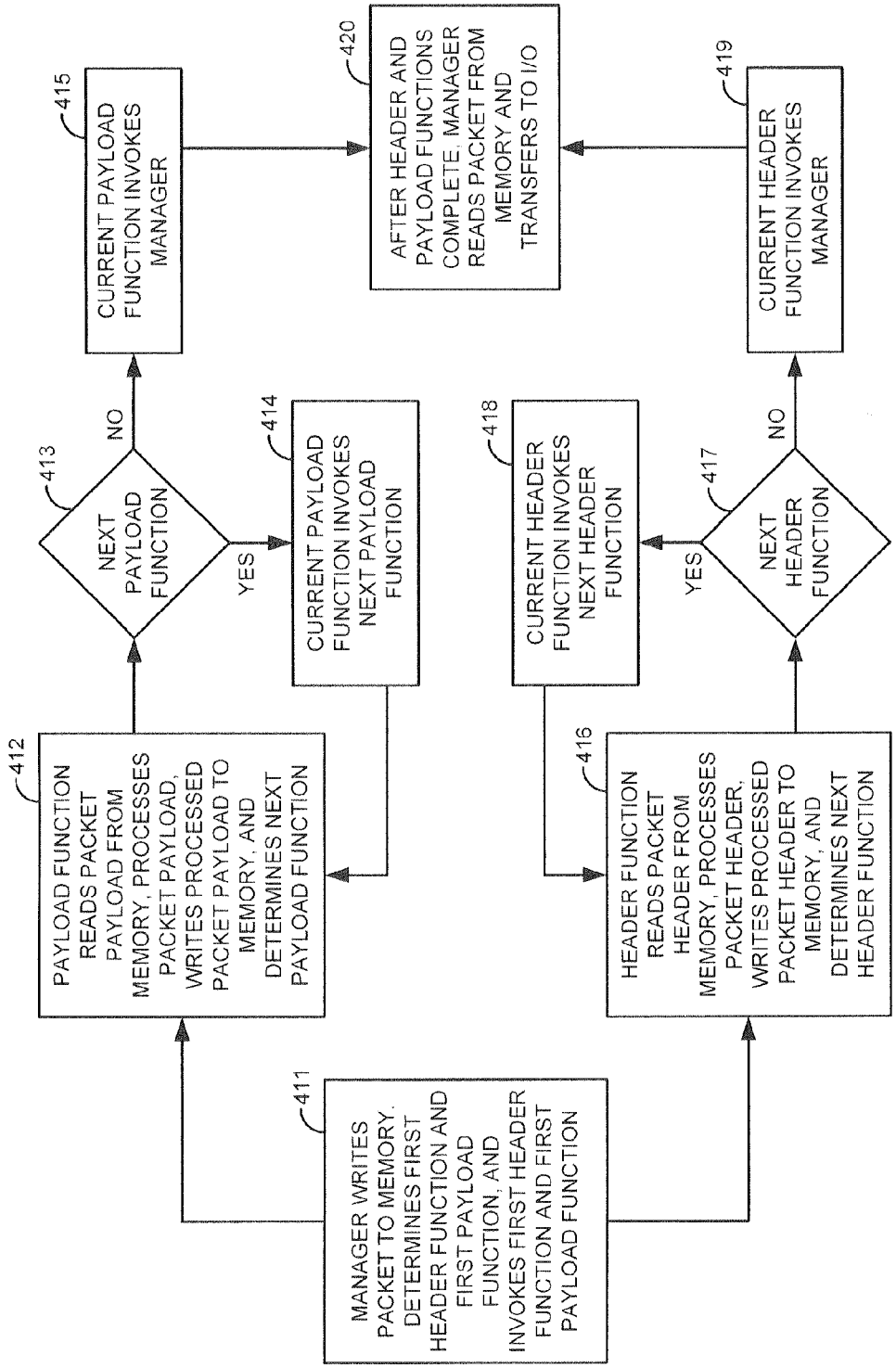
FIG. 4 illustrates network element operation in an example of the invention.

FIG. 4 illustrates the operation of network element 200 in an example of the invention. The reference numbers from FIG. 4 are indicated parenthetically below. Note that I/O operations are similar to that of FIG. 3 and are omitted for clarity on FIG. 4.

Manager 210 writes packet 230 to memory 202 and determines the first header function (if any) and the first payload function (if any) to process packet 230 (411). In this example, the first header function is function 211, so manager 210 invokes function 211 to process packet header 231 (411). Typically, this includes transferring a pointer from manager 210 to function 211 where the pointer points to the current location of packet header 231 in memory 202.

Function 211 reads packet header 231 from memory 202 and processes packet header 231 to provide its communication service function (416). Function 211 writes the processed packet header 231 to memory 202 and determines the next header function (if any) to process packet header 231 (416). If there is a next header function (417), function 211 invokes the next header function (418). In this example, the second header function is function 212, so function 211 invokes function 212 to process packet header 231 (418). Typically, this includes transferring a pointer from function 211 to function 212 where the pointer points to the current location of packet header 231 in memory 202.

Function 212 reads packet header 231 from memory 202 and processes packet header 231 to provide its communication service function (416). Function 212 writes the processed packet header 231 to memory 202 and determines the next function (if any) to process packet header 231 (416). In this example, there is no third header function (417), so function 212 invokes manager 210 to process packet header 231 in memory 202 (419). Typically, this involves transferring a pointer from function 212 to manager 210 where the pointer points to the current location of packet header 231 in memory 202.

In this example, the first payload function is function 213, so manager 210 invokes function 213 to process packet payload 232 (411). Typically, this includes transferring a pointer from manager 210 to function 213 where the pointer points to the current location of packet payload 232 in memory 202.

Function 213 reads packet payload 232 from memory 202 and processes packet payload 232 to provide its communication service function (412). Function 213 writes the processed packet payload 232 to memory 202 and determines the next payload function (if any) to process packet payload 232 (412). If there is a next payload function (413), function 213 invokes the next payload function (418), and the next payload function processes packet payload 232 as described above (412). In this example, there is no second payload function (413), so function 213 invokes manager 210 to process packet payload 232 in memory 202 (415). Typically, this includes transferring a pointer from function 213 to manager 210 where the pointer points to the current location of packet payload 232 in memory 202.

After manager 210 is invoked by a header function and a payload function to indicate that packet processing is complete, manager 210 reads packet header 231 and packet payload 232 from memory 202 to reassemble packet 230 (420). Manager 210 transfers the processed packet 230 to I/O 203 (420).

Note that multiple communication service functions process the packet within the same network element without communication stack processing. Also note that the communication service functions are able to process the header and payload of a packet in parallel at the same time. The parallel processing of packet headers and payloads at the same time further reduces the delay introduced by the network element.

Note that network element 200 transfers processing from function to function. If desired processing could be transferred back to manager 210 after each function, and manager 210 could transfer processing to the next function. Thus, manager 210 could provide a function-to-function interface in some embodiments.

FIG. 5 illustrates the operation of network element 200 in an example of the invention. Manager software 224 includes table 500 or may access table 500. Manager 210 processes table 500 to dynamically process incoming packet flows. A packet flow is a series of packets that are transferred during the same user communication session, where the packets have the same source address and the same destination address.

Table 500 includes rows that respectively indicate packet flows and the sequence of functions that should be used to process a session for each packet flow. The packet flows are typically identified by source packet address, destination packet address, or some other code indicated in the packets. In the same packet flow, the functional sequences may be different between a first group of packets (1-M) and a second group of packets (M-N).

For example, packet flow A could be identified by packets having a given source packet address and destination packet address. If M=2 and N=5,000, then manager 210 sequentially processes the first two packets in packet flow A with functions 1, 2, and 3, and then processes the next 5,000 packets in packet flow A with functions 1, 3, and 4. If function 2 is authentication, then manager 210 only authenticates the first two packets in flow A, but omits authentication for the next 5,000 packets in flow A to improve speed and efficiency.

Note that packet flows A, B, and C each have different functional sequences from one another. Thus, network element 200 dynamically implements variable sequences of functions on a per-flow basis. Within each flow, network element 200 processes packets with different functional sequences based on where the packet is located in the flow.

Note that table 500 has been simplified for clarity, and numerous variations could be implemented. For example, the numbers M and N could be specified differently for each packet flow. Instead of two groups of packets within the same flow having their own functional sequence, several groups of packets within the same packet flow could have their own functional sequence. Also note that table 500 is exemplary, and other processing techniques, such as algorithms and fuzzy logic, could be used to implement the logic of table 500.

Figure 6:
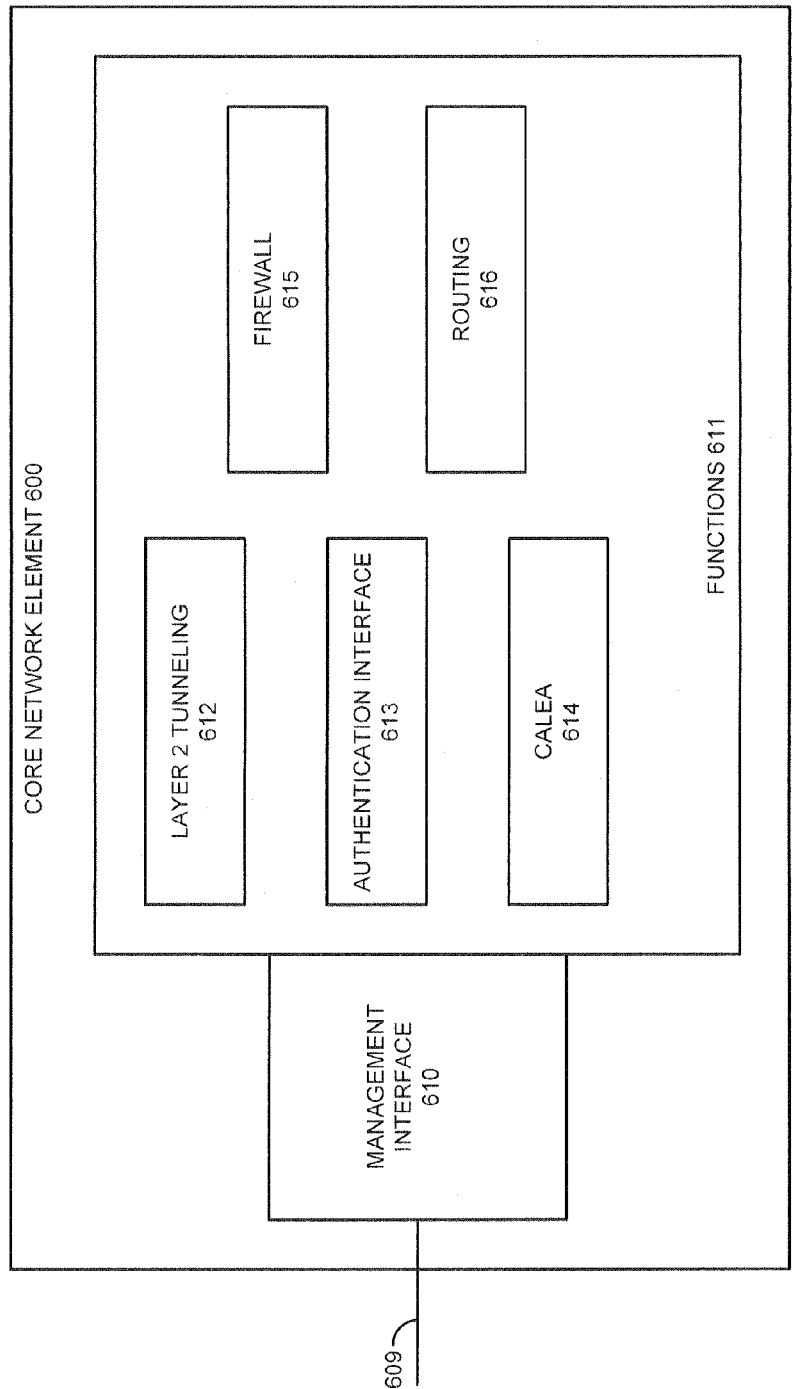
FIG. 6 illustrates a core network element in an example of the invention.

FIG. 6 illustrates core network element 200 in an example of the invention. Core network element 600 includes I/O link 609, management interface 610, and functions 611. Core network element 600 could be configured from network element 200 as follows. I/O link 609 comprises I/O 203 and communication link 209. Management interface 610 comprises processing circuitry 201, memory 202, bus 204, manager 210, and management software 201. Functions 611 comprise processing circuitry 201, memory 202, bus 204, applications 221-223, and functions 211-213. Functions 611 comprise layer 2 tunneling 612, authentication interface 613, CALEA 614, firewall 615, and routing 616.

Layer 2 tunneling 612 comprises a function that transfers communications between peers over a data link, such as the tunneling specified in IETF RFC 3931. A layer 2 tunnel may encapsulate various protocols, such as Ethernet or asynchronous transfer mode, in an internet protocol tunnel. Layer 2 tunneling 612 could comprise a packet data serving node, foreign agent, or a Wireless Fidelity gateway. Authentication interface 613 comprises a function to establish that a user is who they claim to be when requesting network services. Authentication interface 613 could comprise a Radius interface or Diameter interface. Communications Assistance Law Enforcement Act (CALEA) 614 comprises a function that allows a communication network to make communications and associated records for a specific user covertly available to law enforcement agencies. Firewall 615 comprises a function that blocks communications traffic from entering the network based on a security configuration. Firewall 615 typically filters incoming packets based on packet addressing and protocol. Routing 616 comprises a function that selects the path over which a communication is transferred. Routing 616 typically selects a communication link for transferring a packet based on the packet address and a routing table. Routing 616 may also perform load balancing and fail-over logic.

Figure 7:
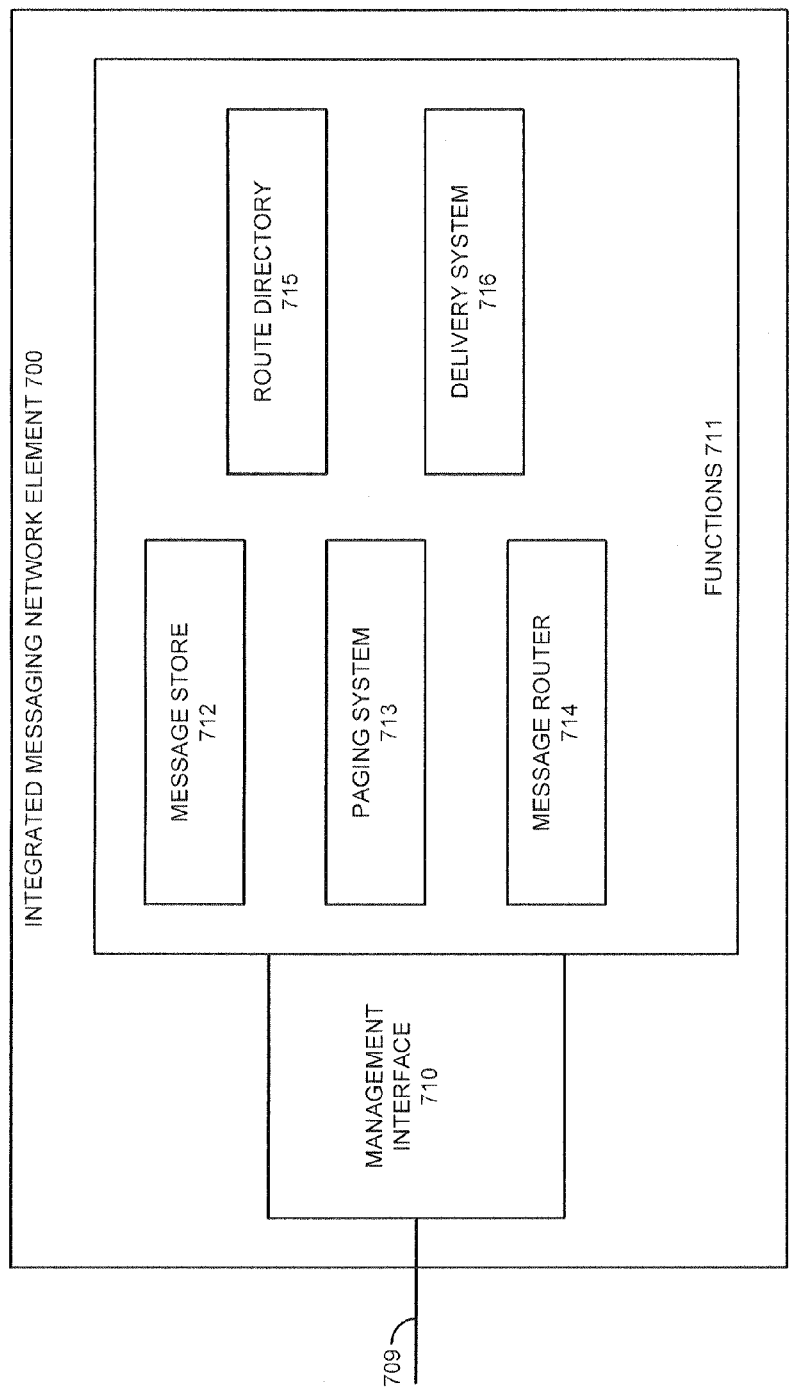
FIG. 7 illustrates an integrated messaging network element in an example of the invention.

FIG. 7 illustrates integrated messaging network element 700 in an example of the invention. Integrated messaging network element 700 includes I/O link 709, management interface 710, and functions 711. Integrated messaging network element 700 could be configured from network element 200 as follows. I/O link 709 comprises I/O 203 and communication link 209. Management interface 710 comprises processing circuitry 201, memory 202, bus 204, manager 210, and management software 201. Functions 711 comprise processing circuitry 201, memory 202, bus 204, applications 221-223, and functions 211-213. Functions 711 comprise message store 712, paging system 713, message router 714, route directory 715, and delivery system 716.

Message Store 712 comprises a function that provides memory storage for user messages. Paging System 713 comprises a function that provides alerts and data, such as a call-back name or number, to a mobile user. Paging system 713 may also wake-up a dormant user device. Message Router 714 comprises a function that selects a message gateway for a message based on route directory 715. Route Directory 715 comprises a function that associates message gateways with individual users. Delivery System 716 comprises a function that exchanges messages with message store 712. Delivery system 716 could comprise a message store server.

Figure 8:
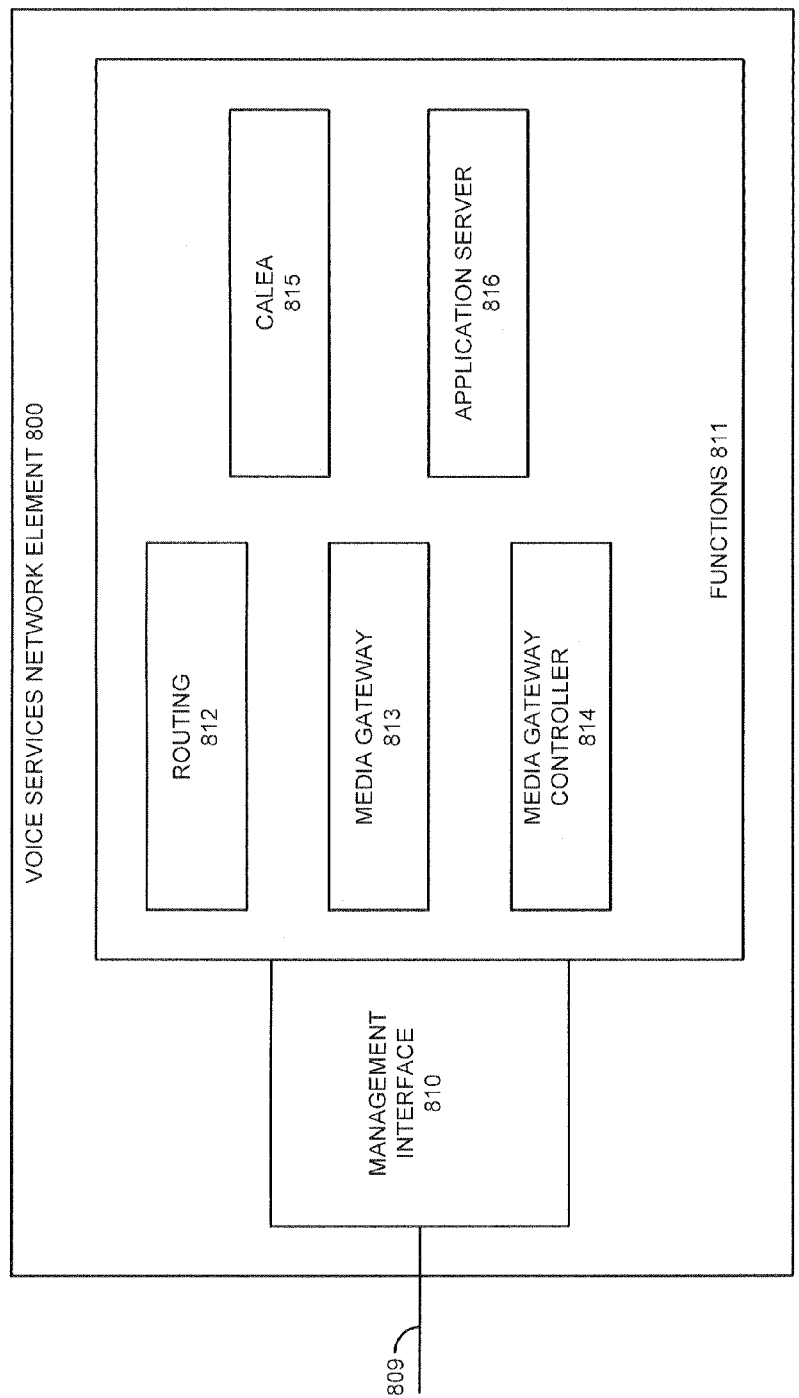
FIG. 8 illustrates a voice services network element in an example of the invention.

FIG. 8 illustrates voice services network element 800 in an example of the invention. Voice services network element 800 includes I/O link 809, management interface 810, and functions 811. Voice services network element 800 could be configured from network element 200 as follows. I/O link 809 comprises I/O 203 and communication link 209. Management interface 810 comprises processing circuitry 201, memory 202, bus 204, manager 210, and management software 201. Functions 811 comprise processing circuitry 201, memory 202, bus 204, applications 221-223, and functions 211-213. Functions 811 comprise routing 812, media gateway 813, media gateway controller 814, CALEA 814, and application server 816.

Routing 812 comprises a function that selects the path over which a communication is transferred. Routing 616 typically selects a communication link for transferring a packet based on the packet address and a routing table. Routing 616 may also perform load balancing and fail-over logic. Media gateway 813 comprises a function that converts user voice traffic between protocols in response to signaling from media gateway controller 814. For example, media gateway 813 might convert user voice information between a circuit-switched protocol and a packet protocol. Media gateway controller 814 comprises a function that processes signaling messages to control media gateway 813. Media gateway controller 814 typically processes called numbers to select the packet addressing and circuit connections used by media gateway 813. Communications Assistance Law Enforcement Act (CALEA) 815 comprises a function that allows a communication network to make communications and associated records for a specific user covertly available to law enforcement agencies. Application server 816 comprises a function that delivers applications, such as 3-way calling, conference calling, and voice mail, to user devices. Application server 816 may provide an interface between user devices and databases or content hosts.

Figure 9:
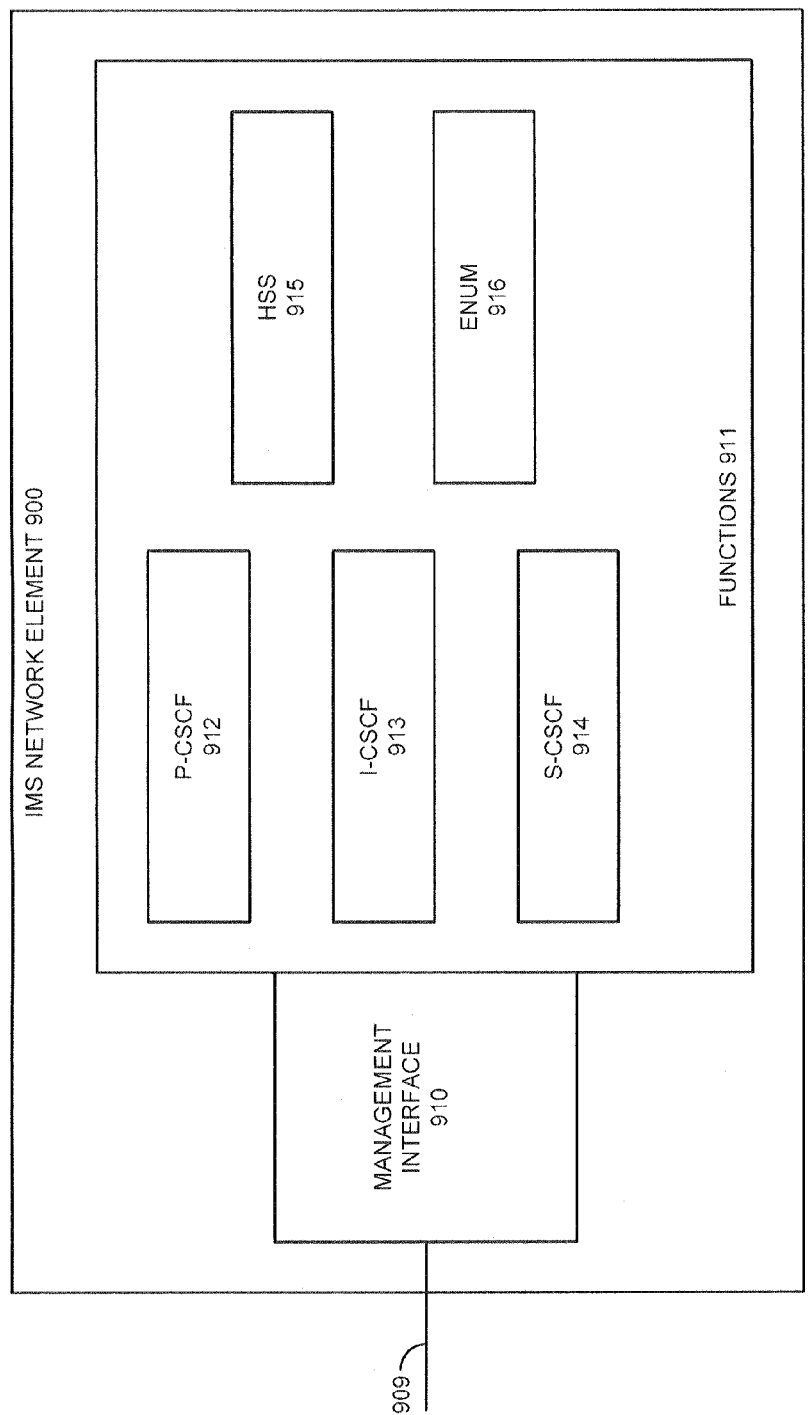
FIG. 9 illustrates an IMS network element in an example of the invention.

FIG. 9 illustrates Internet Protocol Multimedia Subsystem (IMS) network element 900 in an example of the invention. IMS network element 900 includes I/O link 909, management interface 910, and functions 911. IMS network element 900 could be configured from network element 200 as follows. I/O link 909 comprises I/O 203 and communication link 209. Management interface 910 comprises processing circuitry 201, memory 202, bus 204, manager 210, and management software 201. Functions 911 comprise processing circuitry 201, memory 202, bus 204, applications 221-223, and functions 211-213. Functions 911 comprise Proxy Call/Session Control Function (CSCF) 812, Interrogating CSCF 913, Serving CSCF 914, Home Subscriber Server (HSS) 915, and Telephone Number Mapping (ENUM) 916.

Proxy CSCF 912 comprises a function that provides the Session Initiation Protocol (SIP) signaling message interface to a user device. Proxy CSCF 912 performs user registration, security, policy, and accounting services in an IMS environment. Interrogating CSCF 913 comprises a function that queries the HSS 915 to fund a user's location and then forwards SIP signaling messages for user communications to the serving CSCF for the location. Serving CSCF 914 comprises a function that provides session control for a user, including the invocation of application servers, routing, and policy enforcement. HSS 915 comprises a function that provides the master user database that includes user profiles, user authorization and authentication information, and user location information. ENUM 916 comprises a function that translates between uniform resource identifiers, telephone numbers, and records that indicate user preferences for call forwarding and termination.

Network elements 600, 700, 800, and 900 may include a library of applications to provide the service functions described above. These service functions may be dynamically selected on a per flow basis. Different sets of these service functions may be applied to different groups of packets within the same packet flow. The library may also include additional applications to provide the following functions.

Deep Packet Inspection—the function examines the header and data portions of a packet, as opposed to just examining the header. The function typically identifies and classifies the type of data (voice, video, email, music, etc.) that is transferred in the packet.

Denial-of-Service Mitigation—the function inhibits denial-of-service attacks. The function typically prevents an external source from flooding a network with bogus traffic to consume and deny network resources to legitimate traffic.

Intrusion Prevention—the function that controls access to a network by analyzing application content, as opposed to just analyzing packet addressing.

Policy Enforcement—the function performs network access control based on a requesting user's configuration and environment, as opposed to just the user's identity.

Virtual Private Network—the function extends a private network over a public network. The VPN function often transfers private traffic in an encrypted manner over the Internet.

Mobility Manager—the function tracks where a mobile user is currently located, so communication services may be delivered to the user at their current location. The mobility manager could comprise a home agent.

Session Border Controller—the function controls the signaling path between networks in a voice-over-packet network. Control includes signaling redirect and codec selection.

Compression—the function encodes information using fewer bits than a conventional bit representation of the information.

Session Registrar—the function receives IP address registrations for mobile users who change IP addresses as they move about.

Domain Name System—the function translates between user readable names (typically alpha or alpha-numeric strings) and numeric internet protocol addresses.

Lightweight Directory Access Protocol—the function associates user names with user addresses and numbers.

Short Message Service Gateway—the function exchange short message service messages between user systems and other systems, such as email systems.

Simple Mail Transfer Protocol Gateway—the function provides access to email service over the Internet.

802.16 Paging Gateway—The function provides access to paging services over mobile broadband wireless networks, such as WiMAX.

SMS Over SIP Gateway—the function provides access to SMS over SIP networks.

Hypertext Transfer Protocol Gateway—the function provides access to http clients and servers.

Push-To-Talk—the function provides walkie-talkie type services where a user pushes a button to transmit and releases the button to receive.

What is claimed is:

1. A communication network element comprising:
an I/O interface configured to receive and transfer a user packet;
a memory configured to store the user packet, management software, and communication applications;
processing circuitry configured to execute the management software to provide a manager and to execute the communication applications to provide service functions, wherein the service functions retrieve the user packet from the memory based on memory pointers, process contents of the user packet according to at least one of the communication applications, store the processed user packet in the memory, and determine to invoke a next of the service functions, and wherein the manager transfers the user packet between the service functions based on the memory pointers without transferring the user packet through a communication protocol stack between the service functions; and
a bus structure coupling the I/O interface, the memory, and the processing circuitry.

2. The communication network element of claim 1 wherein the service functions include a routing function.

3. The communication network element of claim 2 wherein the service functions include a media gateway function.

4. The communication network element of claim 3 wherein the service functions include a media gateway controller function.

5. The communication network element of claim 4 wherein the service functions include a CALEA function.

6. The communication network element of claim 1 wherein the service functions include a proxy call/session control function.

7. The communication network element of claim 6 wherein the service functions include an interrogating call/session control function.

8. The communication network element of claim 7 wherein the service functions include a serving call/session control function.

9. The communication network element of claim 8 wherein the service functions include a home subscriber server function.

10. The communication network element of claim 9 wherein the service functions include a telephone number mapping function.

11. The communication network element of claim 1 wherein the service functions include a layer two tunneling function.

12. The communication network element of claim 11 wherein the service functions include an authentication interface function.

13. The communication network element of claim 12 wherein the service functions include a CALEA function.

14. The communication network element of claim 13 wherein the service functions include a firewall function.

15. The communication network element of claim 14 wherein the service functions include a routing function.

16. The communication network element of claim 15 wherein the service functions include a deep packet inspection function.

17. The communication network element of claim 16 wherein the service functions include a denial-of-service mitigation function.

18. The communication network element of claim 1 wherein the service functions include a message store function.

19. The communication network element of claim 18 wherein the service functions include a paging system function.

20. A communication network element comprising:
an I/O interface configured to receive and transfer a user packet;
a memory configured to store the user packet, management software, and communication applications, wherein the communication applications provide service functions comprising routing, media gateway, authentication, and firewall service functions;

processing circuitry configured to execute the management software to provide a manager and to execute the communication applications to provide the service functions, wherein the service functions retrieve the user packet from the memory based on memory pointers, process contents of the user packet, store the processed user packet in the memory, and determine to invoke a next of the service functions, and wherein the manager transfers the user packet between the service functions based on the memory pointers without transferring the user packet through a communication protocol stack between the service functions; and a bus structure coupling the I/O interface, the memory, and the processing circuitry.

* * * * *